United States Patent [19]

Perry

[11] Patent Number: 4,537,369

[45] Date of Patent: Aug. 27, 1985

[54] ADAPTER FOR TOWING AIRCRAFT

[75] Inventor: Huntley H. Perry, Washington, D.C.

[73] Assignee: The United States of America as represented by the Secretary of the Navy, Washington, D.C.

[21] Appl. No.: 540,970

[22] Filed: Oct. 11, 1983

[51] Int. Cl.³ .............................................. B64D 3/00
[52] U.S. Cl. .................................... 244/1 R; 244/50; 280/433; 280/504
[58] Field of Search ............... 280/433, 504, 515, 503, 280/460 R, 292; 180/14.1, 14.2, 14.3, 14.4, 14.5; 244/17.17, 50, 1 R

[56] References Cited

U.S. PATENT DOCUMENTS

| 1,637,789 | 8/1927 | Schnitzer | 244/50 |
| 1,847,173 | 3/1932 | Cohen-Venezian | 244/50 |
| 2,280,734 | 11/1939 | Tyler | 280/292 |
| 2,340,273 | 1/1944 | Phillips | 280/33.14 |
| 3,254,904 | 6/1966 | Jewell | 280/433 |
| 3,331,619 | 7/1967 | Muelling | 280/460 R |
| 3,581,843 | 6/1971 | Hadley | 280/503 |

FOREIGN PATENT DOCUMENTS 708075  7/1931  France .................. 244/50

Primary Examiner—Galen Barefoot
Assistant Examiner—Paul J. Bednar
Attorney, Agent, or Firm—R. F. Beers; H. A. David

[57] ABSTRACT

An adapter for existing tow bars or spotting dollies to tow aircraft having non-conventional landing gears has a vertical member which is dimensioned to fit into a socket mounted in the bottom of the aircraft in the vicinity of the nose or tail. A structural cross member, integral with the bottom of the vertical member, has holes in the ends which receive the axle pins located at the ends of the tow bar arms or the lifting arms of the spotting dolly.

2 Claims, 5 Drawing Figures

ADAPTER FOR TOWING AIRCRAFT

BACKGROUND OF THE INVENTION

1. Field of the Invention

The present invention relates to aircraft ground handling accessories, and more particularly to an adapter for towing aircraft which do not have a conventional nose or tail wheel.

2. Description of the Prior Art

For towing conventional aircraft which have either a nose or tail wheel, a tow bar is used to connect the aircraft to the towing vehicle or, alternatively, a spotting dolly is used. The tow bar or the spotting dolly usually are attached to the aircraft nose or tail wheel by means of pins on the ends of the tow bar arms or of the lifting arms of the spotting dolly, which pins engage holes in the ends of the nose or tail wheel axle. The advantage of the spotting dolly over a tow bar is that the spotting dolly lifts the aircraft nose/tail wheel off the deck, transferring weight to the spotting dolly wheels which increases the friction with the deck, i.e., reducing slippage when towing. However, for aircraft with a quadracycle landing gear such a towing arrangement is not effective as there is no point on the centerline of the aircraft to which such a tow bar or spotting dolly can be attached. Therefore, it is desirable to adapt existing tow bars and spotting dollies for use with such non-conventional aircraft.

SUMMARY OF THE INVENTION

Accordingly, the present invention provides an adapter for existing tow bars or spotting dollies to tow aircraft having non-conventional landing gears. The adapter has a vertical member which is dimensioned to fit into a socket mounted in the bottom of the aircraft in the vicinity of the nose or tail. A structural cross member, integral with the bottom of the vertical member, has holes in the ends which receive the axle pins located at the ends of the tow bar arms or the lifting arms of the spotting dolly.

Therefore, it is an object of the present invention to provide an adapter for towing aircraft with non-conventional landing gears, which adapter becomes, in effect, a substitute nose or tail wheel axle.

Other objects, advantages and novel features will be apparent from the following detailed description when read in conjunction with the appended claims and attached drawing.

DESCRIPTION OF THE PREFERRED EMBODIMENT

Figure 1:
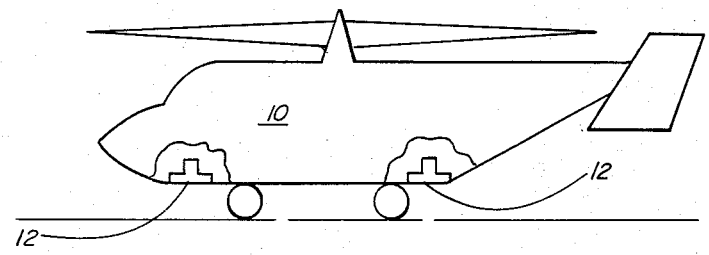
FIG. 1 is a pictorial view of an aircraft modified according to the present invention.
Figure 2:
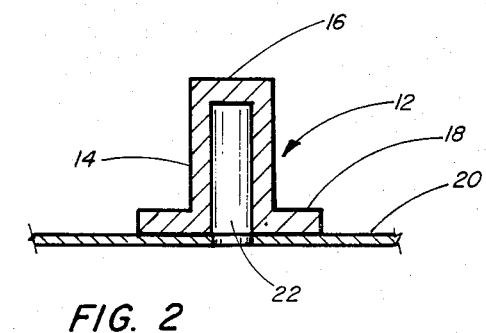
FIG. 2 is a cross-sectional view of the aircraft socket according to the present invention.

Referring now to FIG. 1 an aircraft 10 having a quadracycle landing gear is shown. Mounted at the fore and/or aft of the aircraft 10 on the centerline are a socket 12 in lieu of a nose or tail wheel. The socket 12, as shown in FIG. 2, is essentially a cylindrical tube 14 having a closed end 16 interior to the aircraft 10 and an outward flange 18 by which the socket is attached to the interior of the aircraft skin 20 by any suitable means. The result is a cavity 22 accessible from the exterior of the aircraft 10. The socket 12 and connecting aircraft structure 20 are designed for horizontal towing loads and vertical lifting loads.

Figure 3:
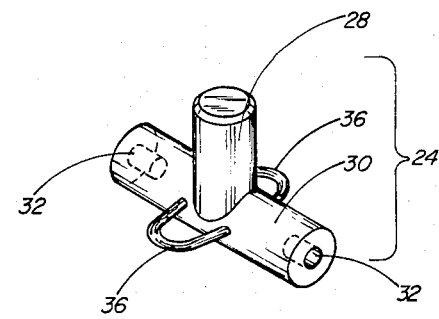
FIG. 3 is a perspective view of an adapter according to the present invention.
Figure 4:
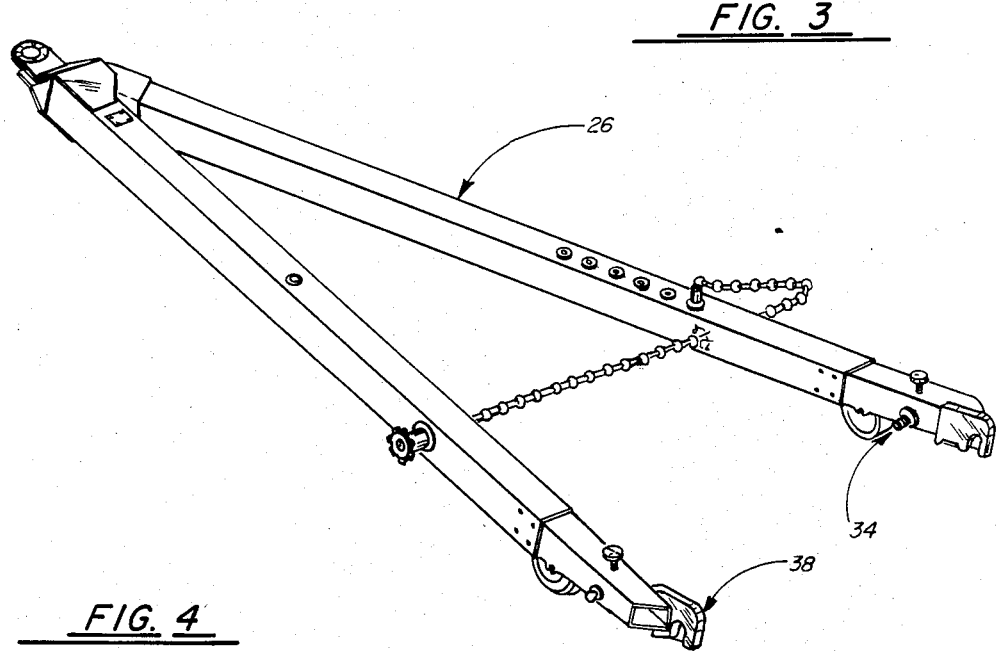
FIG. 4 is a perspective view of a typical tow bar.
Figure 5:
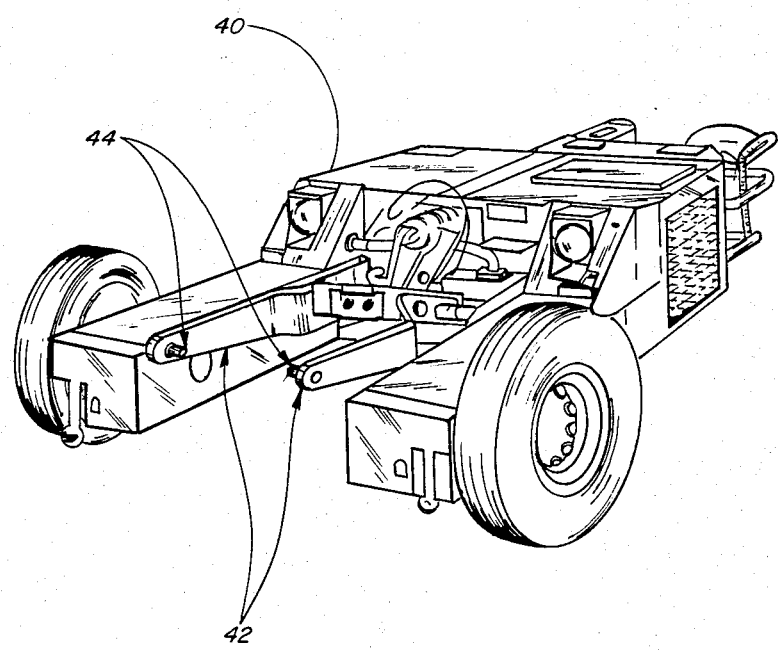
FIG. 5 is a prespective view of a typical spotting dolly.

A towing adapter 24 shown in FIG. 3 may be used with a typical tow bar 26, such as that shown in FIG. 4, or with a spotting dolly 40, such as shown in FIG. 5. The adapter 24 has a vertical section 28 configured to fit in the cavity 22 of the socket 12. An integral horizontal section 30 has a recess 32 in each end configured to receive the axle pins 34 of the tow bar 26 or the axle pins 44 on the lifting arms 42 of the spotting dolly 40.

Optionally, attachment rings 36 may be integrally mounted on the horizontal section 30 to permit connection of the tow bar 26 to the adapter 24 by means of hooks 38 on the tow bar. To attach the tow bar hooks 38 to the adapter 24 the horizontal portion 30 of the adapter is aligned with the aircraft axis.

Therefore, the present invention provides a towing adapter by which standard tow bars or spotting dollies may be used to tow aircraft having non-standard landing gears, i.e., no nose or tail wheel.

What is claimed:

1. Apparatus for connecting a towing device, having laterally spaced arms with attachment means at the ends thereof, to an aircraft having a fuselage, said apparatus comprising:

a socket member fixed in the bottom of said fuselage along the centerline thereof, said socket member comprising a cylindrical tube having a closed end interior to the fuselage and an outward flange by which said socket member is attached to said fuselage, said socket member defining a vertically extending cylindrical recess in said fuselage accessible from the exterior thereof; and a towing adapter comprising a vertical section received in said recess, an elongated horizontal section integrally attached at its middle to the lower end of said vertical section and rotatable between transverse positions relative to the centerline of said fuselage and aligned positions relative thereto, said horizontal section having horizontal recesses in the opposite ends thereof for pivotal engagement by horizontal pins of said attachment means when the horizontal section is in said transverse positions, and first and second ring members extending laterally from opposite sides of the middle of said horizontal section for pivotal engagement by hooks of said attachment means when said horizontal section is in said aligned positions, whereby said apparatus is optionally operable with different towing devices.

2. Apparatus as defined in claim 1 wherein said socket member is a first socket member disposed near the nose end of said fuselage, said apparatus further comprising a second socket member of like construction fixed in said fuselage in spaced relation to said first socket member along said centerline near the tail end of said fuselage, and said vertical section of said towing adapter is cooperable with either of said sockets for towing of said aircraft by said towing device.

* * * * *